US006308077B1

(12) United States Patent
Walsh

(10) Patent No.: US 6,308,077 B1
(45) Date of Patent: Oct. 23, 2001

(54) APPARATUS AND METHOD FOR PROVIDING SYNCHRONIZATION OF BASE-STATIONS IN A COMMUNICATION SYSTEM

(75) Inventor: William J. Walsh, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 07/955,768

(22) Filed: Oct. 2, 1992

(51) Int. Cl.$^7$ ........................................... H04B 7/00
(52) U.S. Cl. ..................... 455/503; 455/67.6; 375/357
(58) Field of Search ............................ 455/12.1, 13.2, 455/33.1, 51.1, 51.2, 54.1, 502, 503, 67.1, 67.6; 375/108, 109, 40, 356, 357, 358; 340/825.01; 331/49

(56) References Cited

U.S. PATENT DOCUMENTS

| | | | |
|---|---|---|---|
| 4,282,493 | * 8/1981 | Moreau | 375/357 |
| 4,565,975 | 1/1986 | Gegner et al. | |
| 4,979,191 | * 12/1990 | Bond et al. | 375/108 |
| 5,016,202 | 5/1991 | Seibel et al. | |
| 5,023,571 | 6/1991 | Fullmer et al. | |
| 5,028,886 | 7/1991 | Seibel et al. | |
| 5,052,028 | * 9/1991 | Zwack | 455/51.1 |
| 5,052,030 | * 9/1991 | Ernst et al. | 375/357 |
| 5,245,634 | * 9/1993 | Averbuch | 375/357 |
| 5,261,118 | * 11/1993 | Vanderspool, II et al. | 455/51.2 |
| 5,331,667 | * 7/1994 | Izumi | 375/357 |

FOREIGN PATENT DOCUMENTS

0459039A1   5/1990   (EP) .
WO92011707 * 7/1992   (WO) .................. 455/51.2

* cited by examiner

Primary Examiner—Thanh Cong Le
(74) Attorney, Agent, or Firm—Richard A. Sonnetag; L. Bruce Terry

(57) ABSTRACT

A communication system (105) utilizes the global positioning system (GPS) to maintain a high degree of accuracy of synchronization of base-stations (115–116). When the GPS signal (106, 107, or 108) is absent, the communication system (105) employs an alternate signal (110–113), such as a WWVB, LORAN-C, and MSF signal, to provide redundant synchronization of the base-stations (115–116). To achieve the degree of synchronization accuracy provided by the GPS signal (106–108), the communication system (105) characterizes the alternate signal (110–113) by utilizing the GPS signal (106–108) when the GPS signal (106–108) is present. When the GPS signal (106–108) is absent, the characterized alternate signal is then employed such that synchronization of the base-stations (115–116) is transparent to the base-stations (115, 116). Use of the GPS signal (106–108) to characterize the alternate signal (110–113) also allows the characterized alternate signal to provide the same degree of accuracy as that of the GPS signal (106–108).

21 Claims, 3 Drawing Sheets

APPARATUS AND METHOD FOR PROVIDING SYNCHRONIZATION OF BASE-STATIONS IN A COMMUNICATION SYSTEM

FIELD OF THE INVENTION

The invention relates generally to communication systems, and more specifically to synchronization of base-stations within communication systems.

BACKGROUND OF THE INVENTION

Some communications systems, and particularly a code-division multiple access (CDMA) digital cellular radiotelephone system, require that a fully functional base-station be synchronized within ±3 µS of Global Positioning System (GPS) time. In the event of a GPS failure, ±10 µS synchronization window is allowed. The present method of providing the required synchronization is through the use of the GPS satellite network and a GPS receiver. In the event of a GPS failure, a Rubidium oscillator is the present solution to providing redundancy. The use of the Rubidium oscillator for redundancy is a costly alternative for a limited amount of failure protection. A typical Rubidium oscillator will keep a previously synchronized base-station operational for a minimum of nineteen (19) hours, assuming the following:

$$\text{Synchronization Time}_{(minimum)} = (10 \text{ µS} - 3 \text{ µS}) / \text{Osc. Accuracy}$$
$$= 7 \text{ µS} / 1 \times 10^{-10}$$
$$= 19 \text{ Hrs.}$$

This extremely short time is obtained at an extremely high cost, approximately $4,000 per oscillator. To maintain the required synchronization between CDMA base stations, a central clocking source must be distributed to all base stations in the network. The use of a "Free Running" oscillator will allow a base-station to drift out of synchronization due to tolerances. The greatest difficulty in utilizing a central clocking source is the distribution of that signal with a consistent and predictable propagation delay throughout the network.

Thus a need exists for an apparatus and method that provides reliable redundancy for an extended period of time, while maintaining a cost-effective system design.

DETAILED DESCRIPTION OF A PREFERRED EMBODIMENT

The invention provides a redundant cellular base-station synchronization system through the reception of low frequency (LF) band standard and navigational broadcasts such as, inter alia, WWVB, LORAN-C, and MSF. Due to the great coverage of LF broadcasts a central clocking source may be used by an entire cellular network mitigating the limitations associated with asynchronous redundancy schemes such as the "Free Running" Rubidium oscillator. In most cases a system clock may be synthesized from received LF broadcasts of greater accuracy and stability than that produced by a Rubidium oscillator at a fraction of the cost. The invention utilizes an operational GPS receiver to characterize alternate clocking sources, such as WWVB, LORAN-C, and MSF, by measuring the phase of the signals, and changes in phase and frequency over time. From this characterization the invention determines optimal filter parameters and phase offsets necessary to make the alternate sources usable. The invention not only provides synchronization to a single base-station, but also provides synchronization between base-stations of a communication system.

Figure 1:
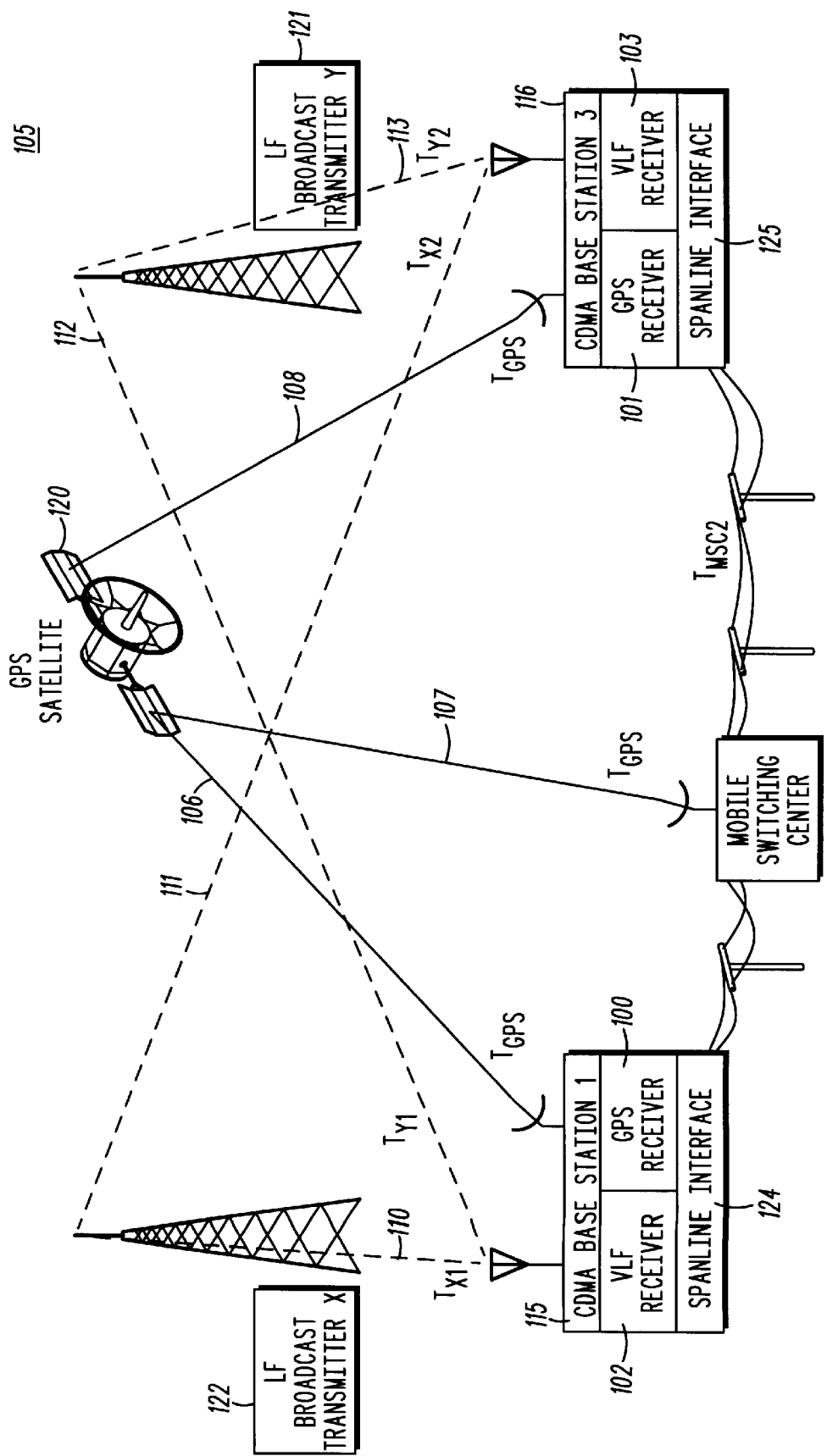
FIG. 1 generally depicts a CDMA digital cellular radiotelephone system which may beneficially employ the present invention.

The invention resides at a cellular base-station 115–116 and is capable of receiving first clocking signals 106–108 and second clocking signals 110–113 from several potential synchronization sources 120–122. The primary clocking source is a GPS receiver (100–101) The redundant sources fall into two (2) categories, LF Casts, and spanline clocks. FIG. 1 generally depicts a CDMA digital cellular radiotelephone system which may beneficially employ the present invention. In alternate embodiments, the cellular radiotelephone system may be a time-division multiple access (TDMA) cellular radiotelephone system, or even a paging system requiring synchronization. As depicted in FIG. 1, there is shown low frequency (LF) transmitters 121–122 and a GPS satellite 120 transmitting signals to base-stations 115–116. Within base-stations 115–116, a common hardware platform is used to receive signals 106–108, 110–113 from transmitters, thus providing a high degree of flexibility at a minimal of cost. From these sources the invention synthesizes a high stability system clock, produces a synchronization strobe, and maintains GPS time.

Each base-station 115–116 is coupled to a GPS receivers 100–101. GPS receivers 100–101 receive GPS signals 106–108 which represent a first clocking rate to the system, and are utilized by base-stations 115–116 for synchronization. Signals 106–108 have a first clocking rate, which in the preferred embodiment is a period of 1 second. Also coupled to each base-station 115–116 is a very low frequency (VLF) receiver which receives precise timing signals 110–113 transmitted by LF transmitters 121–122. Signals 110–113 have a second clocking rate, which in the preferred embodiment is period in the range of 40 ms to 100 ms. However, these signals 110–113 by themselves are not usable, as the propagation delays (TX1, TX2, TY1, TY2) from LF transmitters 121–122 to base-stations 115–116 are unknown. Consequently, GPS signal 106–108 provide greater synchronization accuracy than LF signals 110–113. In accordance with the invention, base-stations 115–116 receive signals from a selected LF transmitter 121–122, determine the clocking rate of the GPS signals 106–108 utilized for synchronization, characterize the second clocking rate of signals 110–113 utilizing the first clocking rate, and employs signals 110–113 having been characterized for synchronization when GPS signals 106–108 are absent. In the preferred embodiment, the characterization of signals 110–113 produces signals having a time-transferred clocking rate. The employment of signals having a time-transferred clocking rate by base-stations 115–116 provides synchronization accuracy as that of GPS signal 106–108. In addition, this approach can maintain network synchronization indefinitely as each base-station 115–116 within the network can synchronize to the same LF transmitter 121–122.

Figure 2:
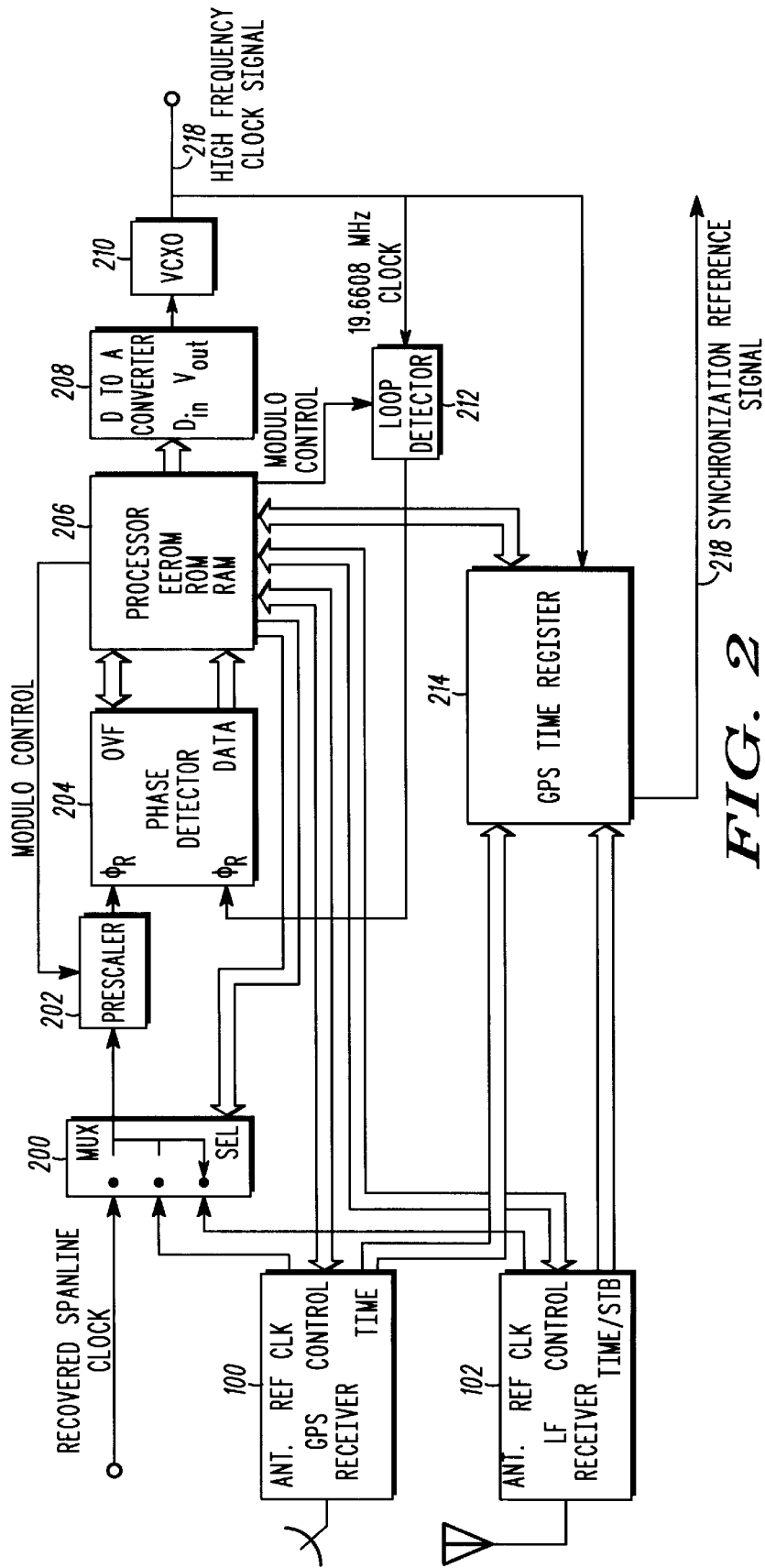
FIG. 2 generally depicts in block diagram form a CDMA synchronization controller in accordance with the invention.

FIG. 2 generally depicts in block diagram form a CDMA synchronization controller in accordance with the invention. In the preferred embodiment, two (2) clocking signals are provided for base-station synchronization by the invention. The first is High Frequency Clock Signal 218 and the second is Synchronization Reference Signal 216, having clocking rates of 19.6608 MHz and a 2 second period respectively.

Figure 3:
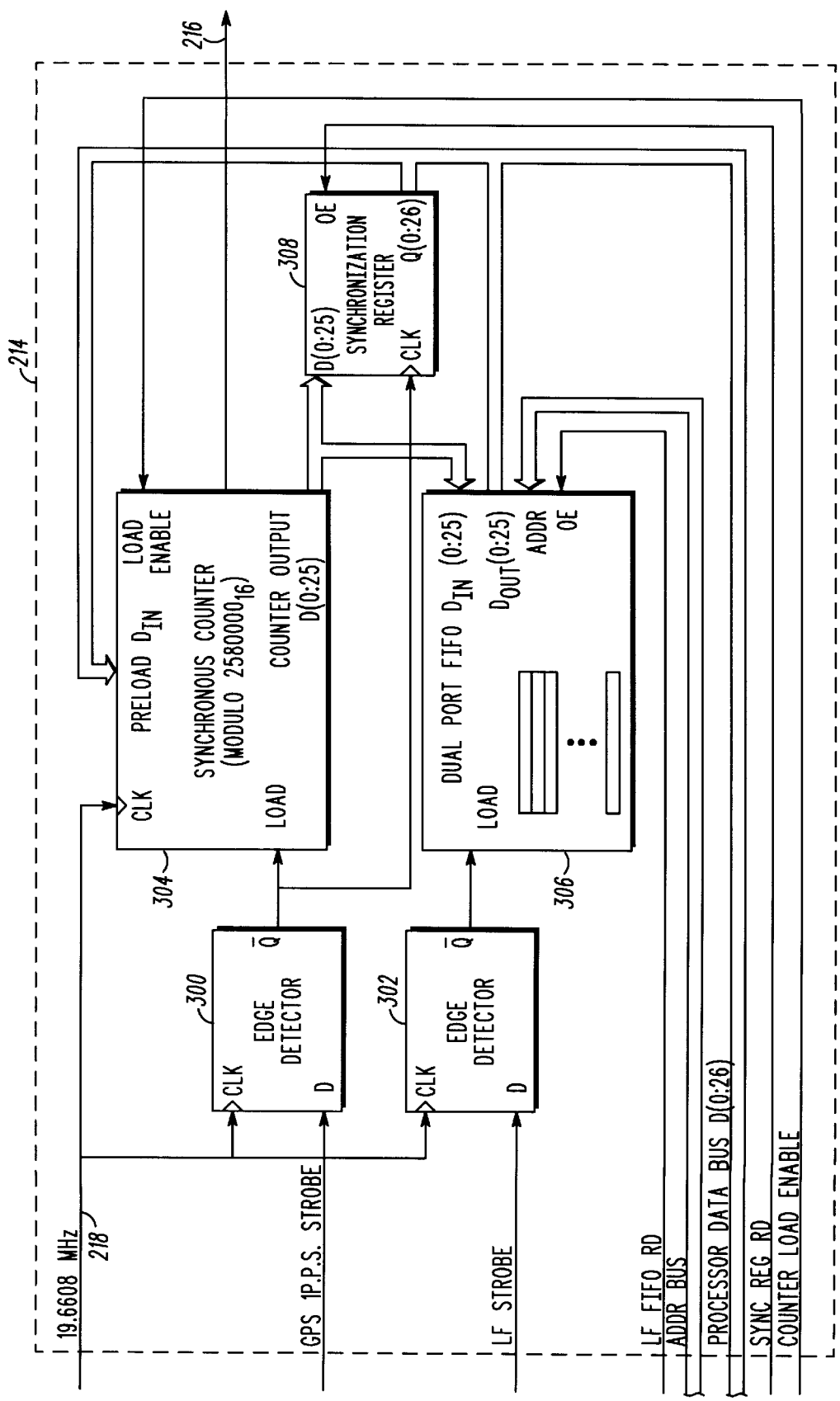
FIG. 3 generally depicts in greater detail GPS time register in accordance with the invention.

A Voltage Controlled Crystal Oscillator (VCXO, 210) produces clock signal 218. Clock signal 218 is fed into GPS Time Register 214. Referring now to FIG. 3, FIG. 3 generally depicts in greater detail GPS time register 214 in accordance with the invention. When clock signal enters GPS time register 214, it is digitally divided using Synchronous Counter 304 to produce the reference signal 216. Micro Processor ($\mu$P, 206), which in the preferred embodiment is a MC 68302, initially synchronizes counter 304 by writing the desired counter value at its preload input. Counter 304 is initialized to this value on receipt of the desired strobe from GPS Receiver 100–101. An Edge Detector 300 is used to synchronize the GPS Receiver 100–101 strobe with clock signal 218.

After the initial counter 304 synchronization is complete, synchronization is maintained by monitoring any counter drift relative to GPS receiver 100–101 strobe. This is accomplished by recording the counter 304 value on receipt of GPS Receiver 100–101 strobe in a Synchronization Register 308. After each GPS strobe, $\mu$P 206 reads the contents of register 308 and compares this value with its initial synchronized value. $\mu$P 206 will then make any necessary adjustments in the output frequency of VCXO 210 to minimize the measured synchronization error. The output frequency of VCXO 210 is controlled by $\mu$P 206 by writing the desired digital value to a Digital to Analog converter (D/A, 208). D/A 208 produces a DC voltage at the control input of VCXO 210, which produces an output frequency proportional to this control voltage. $\mu$P 206 implements a digital filter to attenuate phase variations received by GPS receiver 100–101 to produce a stable clock frequency output from VCXO 210.

In a frequency locked condition where the frequency of VCXO 210 is consistently maintaining synchronization, GPS Time Register 214 characterizes the selected redundant synchronization source. This is accomplished using the Dual Port FIFO memory 306 to time stamp strobes received from an LF receiver 121, 122. FIFO 306 is used to prevent processor latency problems in supporting strobe timing from various LF sources. FIFO 306 records the contents of the counter 304 upon receipt of each strobe from LF receiver 121, 122. $\mu$P 206 reads the time stamp information of FIFO 306 and determines the phase and period of the received LF strobes. Edge Detector 302 is used to synchronize the LF receiver 121, 122 strobe with the clock signal 218.

In the event of a GPS network failure, $\mu$P 206 will compare the contents of counter 304 with those stored in the FIFO 306 received by the LF receiver 121, 122. $\mu$P 206 will adjust the frequency of VCXO 210 by updating the digital value of D/A 208 to maintain the proper phase relationship.

The Mobile Switching Center (MSC, 123) will instruct all base-stations 115, 116 in the network to utilize the same LF transmitter, say LF transmitter, 122, as a synchronization source via spanline interface 124. This eliminates any drift due to frequency differences between multiple synchronization sources.

A Frequency Locked Loop (FLL) is provided to utilize a recovered spanline clock as a potential redundant synchronization source. In this alternate embodiment, spanline clock may represent a second clocking signal having a second clock rate. The FLL is composed of Reference Multiplexer 200, Prescaler 202, Phase Detector 204, $\mu$P 206, D/A 208, VCXO 210, and Loop Divider 212. Multiplexer 200 is a digital multiplexer which selects the desired frequency reference source. Prescaler 202 is a digital divider used to divide the frequency of reference signal 216 to a value that an integer multiple will produce the desired clock signal 218. Phase detector 204 measures the phase difference between the reference signal 216 and the clock signal 218 and produces a digital value proportional to the measured difference that is read by $\mu$P 206. $\mu$P 206 implements a digital filter to satisfy loop stability requirements and attenuate jitter present on the recovered spanline clock. The output of the digital filter is fed into the D/A 208 which controls the output frequency of the VCXO 210. The output of the VCXO 210 is fed into loop divider 212 which digitally divides the frequency of clock signal 218 to the same as that at the output of prescaler 202, completing the loop.

Transmissions within the LF radio frequency band are primarily ground based waves and are not affected by changes in the ionosphere level. Therefore, LF radio frequencies (30 kHz to 300 kHz) exhibit only minor phase variations over time. For this reason, the LF band is used primarily for standard time and navigation broadcasts. There are many LF broadcasts (LORAN-C, WWVB) that can be utilized for a central synchronization source.

LORAN-C (LOng RAnge Navigation) is one potential LF synchronization source. It is perhaps one of the most useful in that there are more than fifty (50) transmitters throughout the world providing coverage to most of the northern hemisphere. By using the LORAN-C carrier frequency (100 kHz) as a reference to a frequency locked loop, a system clock with an accuracy of $1 \times 10^{-2}$ can be realized. LORAN-C provides additional redundancy in that it is a Time Division Multiplexed system and multiple transmitters may be monitored using a single LF receiver 121, 122.

Thus, it will be apparent to one skilled in the art that there has been provided in accordance with the invention, an apparatus and method for providing synchronization of base-stations in a communication system that fully satisfies the aims and advantages set forth above.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What I claim is:

1. An apparatus for providing synchronization for a base-station in a communication system, the apparatus comprising:

means for receiving a first clocking signal from a source external to the base station, the first clocking signal having a first frequency with a first stability and utilized for synchronization when available;

means for providing a second clocking signal having a second frequency with a second stability, the second stability being less than the first stability;

means for characterizing the second stability of the second clocking signal utilizing said first clocking signal to produce characterization information; and means, coupled to said means for characterizing, for employing said second clocking signal and said characterization information for synchronization when said first clocking signal is absent.

2. The apparatus of claim 1 wherein said first clocking signal is a global positioning system (GPS) clocking signal.

3. The apparatus of claim 1 wherein said second clocking signal is a LOng RAnge Navigation (LORAN) clocking signal, a signal output from a voltage controlled oscillator (VCO) or a spanline clock.

4. The apparatus of claim 1 wherein said apparatus provides synchronization between base-stations of a communication system.

5. A base-station in a communication system employing an apparatus for providing synchronization, the base-station comprising:

means for receiving a first clocking signal from a source external to the base station, said first clocking signal having a first clocking rate with a first stability;

means for receiving a second clocking signal having a second clocking rate with a second stability, the second stability being worse than the first stability;

means for improving the stability of said second clocking rate of said second clocking signal utilizing said first clocking rate by comparing said first clocking rate and said second clocking rate over a period of time and generating characterization information; and means for employing said second clocking signal and said characterization information for synchronization when said first clocking signal is absent.

6. The base-station of claim 5 wherein said first clocking signal is a global positioning system (GPS) clocking signal.

7. The base-station of claim 5 wherein said second clocking signal is a LOng RAnge Navigation (LORAN) clocking signal, a signal output from a voltage controlled oscillator (VCO) or a spanline clock.

8. The base-station of claim 5 wherein said first clocking signal provides greater synchronization accuracy than the second clocking signal having improved accuracy.

9. A cellular radiotelephone system requiring synchronization between base-stations, the base-stations being initially synchronized to one another by a global positioning system (GPS) signal having a known clocking rate, the cellular radiotelephone system comprising:

a first base-station employing means for receiving the GPS signal and means for receiving a low frequency (LF) signal transmitted by a LF transmitter, said LF signal having a clocking rate less than said known clocking rate of said GPS signal;

a second base-station employing means for receiving the GPS signal and means for receiving said LF signal transmitted by said LF transmitter;

means, at each base-station, for characterizing each received LF signal utilizing each received GPS signal to produce a signal having a time-transferred clocking rate;

means, when said GPS signal is removed, for employing said signal having a time-transferred clocking rate to provide the required synchronization between said base-stations.

10. The cellular radiotelephone system of claim 9 wherein said GPS signal provides greater synchronization accuracy than an un-characterized LF signal.

11. The cellular radiotelephone system of claim 10 wherein said means for employing further comprises means for employing said signal having a time-transferred clocking rate to provide synchronization accuracy as that of said GPS signal.

12. A method of providing synchronization for a base-station in a communication system, the method comprising:

comparing a first clocking signal received from a source external to the base station to an alternate clocking source;

characterizing, based on the step of comparing, the differences between said first clocking signal and said alternate clocking source to provide characterization information operable to improve the stability of said alternate clocking source; and employing said alternate clocking source and said characterization information for synchronization when said first clocking signal is absent.

13. The method of claim 12 wherein said step of comparing said first clocking signal and said alternate clocking source further comprises comparing either a frequency or phase of said first clocking signal and said alternate clocking source.

14. The method of claim 13 wherein said step of employing further comprises the step of employing said second clocking signal having improved accuracy to provide synchronization accuracy as that of said first clocking signal.

15. An apparatus for providing synchronization comprising:

means for receiving a first clocking signal from a source external to the apparatus;

means for providing a second clocking signal, wherein the second clocking signal is less stable than the first clocking signal;

means for comparing the first clocking signal to the second clocking signal;

means for characterizing the second clocking signal based on the first clocking signal to generate characterization information operable for increasing the stability of the second clocking signal; and means for employing the second clocking signal and the characterization information when the first clocking signal is absent.

16. An apparatus for providing synchronization comprising:

a receiver for receiving a first clocking signal from a source external to the apparatus;

a localized oscillator to provide a second clocking signal;

a microprocessor for digital filtering the first clocking signal to remove errors associated with the first clocking signal and for determining a change over time in the second clocking signal with respect to the first clocking signal; and means for adjusting the second clocking signal based on the determined change over time when the first clocking signal is unavailable.

17. The apparatus of claim 16, wherein the means for adjusting the second clocking signal based on the determined change over time further comprises means for adjusting a frequency of the second clocking signal based on the determined change over time.

18. The apparatus of claim 16, wherein the apparatus is coupled to a base-station of a cellular radiotelephone system.

19. A wireless communication system requiring synchronization between fixed stations, the wireless communication system comprising:

means, at a first fixed station, for receiving a clocking signal having a high stability and means for receiving a first clocking signal having a low stability;

means, at a second fixed station, for receiving the clocking signal having a high stability and means for receiving a second clocking signal having a low stability;

means, at each fixed station, for comparing each received first and second clocking signals having a low stability with the clocking signal having a high stability to produce comparison information;

means, when the clocking signal having a high stability is removed, for employing the clocking signal having a low stability and the comparison information to provide the required synchronization between the fixed stations.

20. The wireless communication system of claim 19 wherein the means for employing further comprises means for employing the clocking signal having a low stability and the comparison information to provide synchronization stability substantially as that of the clocking signal having a high stability.

21. The wireless communication system of claim 19, wherein the wireless communication system further comprises a code division multiple access (CDMA) cellular radiotelephone system, a time division multiple access (TDMA) cellular radiotelephone system or a paging system.

* * * * *

UNITED STATES PATENT AND TRADEMARK OFFICE
CERTIFICATE OF CORRECTION

PATENT NO.   : 6,308,077 B1
DATED        : October 23, 2001
INVENTOR(S)  : Walsh It is certified that error appears in the above-identified patent and that said Letters Patent is hereby corrected as shown below:

<u>Column 6,</u>
Line 31, delete entire claim # 14.

Signed and Sealed this

Twenty-third Day of April, 2002

Attest:

JAMES E. ROGAN
Attesting Officer   Director of the United States Patent and Trademark Office